United States Patent [19]

Karlen

[11] 4,258,939
[45] Mar. 31, 1981

[54] END CONNECTION STRUCTURE FOR A HOLLOW CONDUCTOR ASSEMBLY

[75] Inventor: Urs Karlen, Lupsingen, Switzerland

[73] Assignee: BBC Brown, Boveri & Company, Limited, Baden, Switzerland

[21] Appl. No.: 795,431

[22] Filed: May 10, 1977

[30] Foreign Application Priority Data

Jun. 21, 1976 [CH] Switzerland .................. 7868/76

[51] Int. Cl.³ .................................... F16L 13/08
[52] U.S. Cl. ........................ 285/137 R; 174/15 C; 285/173; 285/177; 285/287; 285/381; 310/65
[58] Field of Search .............. 403/273; 285/381, 41, 285/137 R, 334.5, 177, 287, 173; 174/15 C; 310/54, 59, 213, 65; 326/62

[56] References Cited

U.S. PATENT DOCUMENTS

| 1,004,270 | 9/1911 | Jahnke | 285/381 |
| 3,185,872 | 5/1965 | Weissheimer et al. | 310/213 X |
| 3,439,738 | 4/1969 | Dixon et al. | 285/137 R X |
| 3,805,567 | 4/1974 | Agius-Sinerco | 285/381 |
| 3,955,110 | 5/1976 | Karlen | 310/54 |
| 4,113,287 | 9/1978 | Bogatirev et al. | 285/137 R X |
| 4,133,559 | 1/1979 | Davies | 285/137 R X |

FOREIGN PATENT DOCUMENTS 875931 8/1961 United Kingdom ...................... 285/41

Primary Examiner—Thomas F. Callaghan
Attorney, Agent, or Firm—Burns, Doane, Swecker & Mathis

[57] ABSTRACT

A coupling structure for a hollow conductor assembly in which the hollow conductors form at least a part of the winding of an electrical machine to be cooled by passing a fluid coolant through the conductors. A nipple made from a hard material such as a nickel-chrome steel and which serves as an electrical as well as a fluid coolant connection to the hollow conductors is shrunk onto a sleeve made of a relatively softer material such as copper in which the end portions of the hollow conductor assembly are embedded and soldered to form a gastight connection. The inner wall of a cylindrical section of the nipple is provided with a series of circumferentially extending ribs and these ribs press into the surface of the softer sleeve during the nipple-shrinking operation. The nipple is also provided with a second section of smaller diameter than the sleeve-receiving section for connection to a fluid coolant carrying pipe.

6 Claims, 2 Drawing Figures

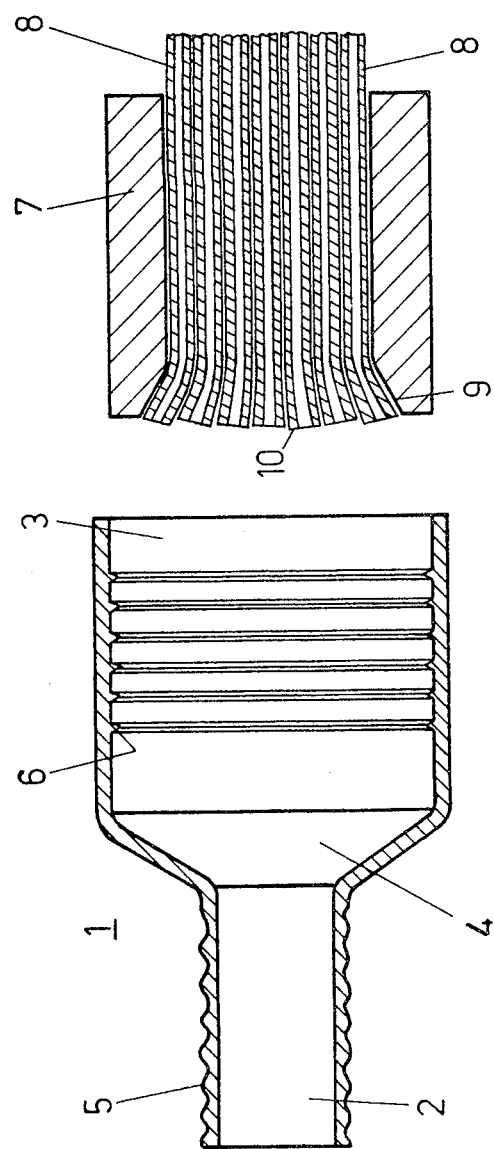

END CONNECTION STRUCTURE FOR A HOLLOW CONDUCTOR ASSEMBLY

BACKGROUND OF INVENTION

This invention relates to an improved construction for an end connection or coupling structure for a hollow conductor assembly in which the hollow conductors form at least part of the winding of an electrical machine to be cooled by passing a fluid coolant through the conductors. The end portion of the hollow conductor assembly is embedded gas-tight within a sleeve which is secured within a nipple to which is connected a pipe for supplying the fluid coolant. The invention also relates to an improved method for making the improved structure.

A method for the manufacture of an end conductor structure of the general type described which serves simultaneously for making a circuit connection to the fluid-cooled winding of an electrical machine as well as providing a coolant feed and coolant outlet, wherein the ends of the bundled hollow conductors forming the conductor rods to be connected are bent in alignment, are inserted in openings in the front end walls of a circuit-and connection sleeve and are sealed at, and connected to these walls is disclosed in published German application DT-AS No. 1,281,016. These walls are then inserted into opposed openings of a T-shaped circuit-and connection sleeve and joined with this sleeve.

However, this method is not economical, especially in the case of large-sized electrical machines because the soldering can be accomplished only when the conductor ends are in a vertical position. Otherwise, the distribution of the solder will not be uniform, this distribution being only marginally effective under the best conditions due to the narrow spaces between the conductor ends. Furthermore, the soldering of the sealing walls to the connection sleeve is complicated because the sleeve and walls must be heated and the solder can be applied only with great difficulties.

SUMMARY OF THE INVENTION

The object of the present invention is to provide an end connection or coupling structure for a hollow conductor assembly of the above generally described type which is free from the disadvantages of the known arrangement and which is distinguished by its simple and economical manufacture.

The invention solves the problem basically by an arrangement wherein a nipple, which serves as an electrical connection to the hollow conductor assembly as well as a fluid coolant inlet, or outlet from the winding, is shrunk onto a sleeve in which the end portions of the hollow conductors are embedded and soldered together. The improved coupling in accordance with the invention offers the significant advantage that it enables a tight connection of the ends of the hollow conductors with the pipes which deliver the fluid coolant to the winding as well as with the pipes which remove the coolant from the winding, a connection which can be accomplished in a simple and economic manner.

It will be advantageous to provide the inner wall of that section which is to be shrunk onto the sleeve in which the hollow conductors are embedded with at least one and preferably several circumferentially extending ribs, the ribs being of a material which is harder than that of the sleeve whereby the ribs become pressed into the wall of the softer sleeve to such extent that when the nipple-shrinking operation has been completed, the internal wall proper of the shrink section will have become firmly pressed upon the external surface of the sleeve. For this purpose it has been found that a nickel-chrome steel is a good material for the nipple and copper which is softer than the steel is a good material for the sleeve. In order to avoid large tubing profiles it will be advantageous to provide the nipple with a fluid coolant tube-connecting section of smaller diameter than that which is necessary to accommodate the sleeve-enclosed hollow conductor ends. Also, in order to improve the adhesion and seal of the fluid coolant supply pipe to the nipple, the latter can be provided with transverse grooves in its outer surface. "Silfos" foil has been found to be a particularly suitable solder for effecting the desired gas-tight embedding of the conductor ends within the sleeve.

A further object of the invention is to provide an improved method for making a coupling having the construction in accordance with the above-noted novel features which comprises the steps of embedding the end portions of the hollow conductors in a gas-tight manner within the sleeve, heating the nipple, pushing the nipple over the sleeve and then permitting the structure to cool thus shrinking the nipple onto the sleeve. The nipple is most expediently heated to approximately 850° C. in an inductive heating unit for the shrinking operation. It is advantageous for the purpose of connecting the end portions of the hollow conductors with the sleeve to first push the assembly of conductor ends completely through the sleeve, place foils of "Silfos" solder between the end portions of the conductors in the assembly and thereafter to pull the conductor ends back during the soldering and after the solder has melted, to such extent that the ends will protrude approximately 1 mm beyond the end face of the sleeve.

BRIEF DESCRIPTION OF DRAWINGS

The foregoing objects and other advantages inherent in the improved construction for the hollow conductor assembly coupling and its method of manufacture will become more apparent from the following detailed description of a preferred embodiment thereof and the accompanying drawings which illustrate it; wherein FIG. 1 is a longitudinal axial section of the nipple component of the coupling; and FIG. 2 is similar longitudinal axial section of the sleeve component together with the assembly of hollow conductors embedded therein.

DETAILED DESCRIPTION OF PREFERRED EMBODIMENT

With reference now to FIG. 1 the conductor end coupling includes a nipple component 1 having a relatively small diameter tubular connecting section 2 for the pipe, not shown, through which the coolant passes, a relatively larger diameter tubular shrink section 3 and a tapered intermediate section 4. The outer surface of the tubular connecting section 2 is provided with a series of transverse grooves 5 which assure a firm grip for the pipe, which is fitted onto the connecting section 2. The internal wall of the shrink section 3 is provided with a series of axially spaced circumferentially extending ribs 6 which extend over the entire perimeter and have a triangular axial profile.

The other component of the coupling which is to be mated to the nipple 1 consists of a sleeve 7 into which are soldered a large number of hollow conductors 8. The inner diameter of sleeve 7 is flared at one end to form a frustoconical surface 9. The end portions of the conductors located within this conical surface 9 are flared slightly at 10 so as to substantially fill it, and the ends of the conductors extend slightly beyond the end of the sleeve.

To effect the desired connection between sleeve 7 and shrink section 3, the end portions 10 of the hollow conductors are first pushed completely through sleeve 7 from right to left as seen in FIG. 2 so that they protrude slightly from the left end, whereupon they are flared to fill the conical opening 9. "Silfos" soldering foils, not shown, are then inserted between the conductors 8, sleeve 7 is then heated, and the conductors ends 10 are then pulled back to the right when the solder foils reach their liquid state until they protrude only about 1 mm beyond the left end of sleeve 7. In this manner there is established a solid and absolutely gas-tight connection of the conductors 8 with sleeve 7. Next, the shrink section 3 of the nipple 1 is then heated within an inductor coil to approximately 850° C., with argon being blown through the nipple in order to avoid any oxidation of the internal surface of section 3. After sufficient heating, the expanded section 3 is then pushed over sleeve 7 and permitted to cool in the open air. The resulting shrinkage of section 3 onto sleeve 7 will cause the ribs 6 to be forced into the material of the sleeve, which is relatively softer than the ribs, to such depth that the inner wall proper of the shrunk section 3 will have become pressed firmly upon the external surface of the sleeve 7.

I claim:

1. An electrically conductive coupling structure for an assembly of a plurality of hollow conductors in which the hollow conductors form at least part of a winding for an electrical machine to be cooled by passing a fluid coolant through the conductors, comprising: a cylindrical sleeve, said assembly being received by the cylindrical sleeve with each of the plurality of hollow conductors being soldered to one another and the assembly of the plurality of the hollow conductors being soldered to the cylindrical sleeve to form a gas-tight seal, and a nipple including a cylindrical section receiving said sleeve and which engages the periphery of the latter in a gas-tight manner by means of a shrink fit during cooling, said nipple having means for connecting said nipple to a source of said fluid coolant.

2. A coupling structure as defined in claim 1 wherein the inner wall of said cylindrical section of said nipple is provided with at least one rib which extends around the entire perimeter, said nipple and hence also said rib being made from a material harder than the material from which said sleeve is made, said rib being pressed into the softer surface of said sleeve.

3. A coupling structure as defined in claim 2 wherein said nipple is made from a nickel-chrome steel and said sleeve is made from copper.

4. A coupling structure as defined in claim 1 wherein said means for connecting said nipple to a source of said fluid coolant includes a second cylindrical section having a diameter smaller than that of the section fitted to said sleeve, said second section being provided for connection to a fluid coolant pipe.

5. A coupling structure as defined in claim 4 wherein the periphery of said second cylindrical section of said nipple is provided with transversely extending grooves to assure a firm grip with said pipe.

6. The coupling structure of claim 1, wherein one end of the sleeve is tapered and ends of the electrical conductors are flared to match the tapered end.

* * * * *